United States Patent [19]

Franz et al.

[11] 4,451,697

[45] May 29, 1984

[54] METHOD FOR ESTABLISHING CONNECTIONS BETWEEN SUBSCRIBER STATIONS WHICH OPERATE WITH DIFFERENT TRANSMISSION PROCEDURES BY WAY OF SIGNAL CONVERTERS INCLUDING BUSY-FREE CONTROL

[75] Inventors: Dietmar Franz, Puchheim; Norbert Torggler, Munich, both of Fed. Rep. of Germany

[73] Assignee: Siemens Aktiengesellschaft, Berlin & Munich, Fed. Rep. of Germany

[21] Appl. No.: 285,626

[22] Filed: Jul. 21, 1981

[30] Foreign Application Priority Data

Aug. 14, 1980 [DE] Fed. Rep. of Germany ....... 3030887

[51] Int. Cl.³ .................... H04L 11/06; H04L 11/20
[52] U.S. Cl. ...................................... 178/3; 178/17.5; 178/26 R
[58] Field of Search .................. 178/3, 69 G, 79, 2, 178/26 A, 26 R; 370/17; 179/18 ES; 375/4

[56] References Cited

U.S. PATENT DOCUMENTS 3,963,867 6/1976 Duuren et al. ................ 178/3 X

Primary Examiner—Stafford D. Schreyer
Attorney, Agent, or Firm—Hill, Van Santen, Steadman & Simpson

[57] ABSTRACT

A method is disclosed for establishing connections from subscriber stations or transmission lines connected to a data exchange system to signal converters. The data exchange system receives information concerning the free state or busy state of the signal converters. For this purpose, it is provided that, having forwarded the signals with which it has been previously supplied for signal conversion, the signal converter emits a special free signal which may differ from an accompanying signal indicating the end of signal transmission and which changes the busy state signal ("1") indicative of the busy state of the signal converter directly into a free state signal ("0").

1 Claim, 2 Drawing Figures

METHOD FOR ESTABLISHING CONNECTIONS BETWEEN SUBSCRIBER STATIONS WHICH OPERATE WITH DIFFERENT TRANSMISSION PROCEDURES BY WAY OF SIGNAL CONVERTERS INCLUDING BUSY-FREE CONTROL

BACKGROUND OF THE INVENTION

1. Field of the Invention

The present invention relates to a method for establishing connections from subscriber stations and transmission lines which process and transmit signals with different procedures and which are connected to a data exchange system to signal converters which are likewise connected to the data exchange system and whose status signals, which indicate availability or seizure, are stored in the data exchange system, and more particularly to such a method in which, on the occurrence of a connection requests from a subscriber station or via a transmission line for the establishment of a connection to a signal converter, the existence of free status signals in the data exchange system is established, and in which a free status signal which indicates that the signal converter is available is changed, upon the seizure of the signal converter in question, into a busy status signal which is not changed into a free status signal until a signal converter in question again becomes available.

2. Description of the Prior Art

A circuit arrangement is already known, which may be referred to as a service or log converter and, in brief, as a signal converter and which serves to transmit digital signal between transmitting and/or receiving devices operating in accordance with a first data transmission procedure and a first data format and transmitting and/or receiving devices operating in accordance with a second data transmission procedure which differs from the first and in accordance with a second data format which differs from the first data format, via an exchange system (German patent application No. P 29 38 750, corresponding to U.S. patent application Ser. No. 185,559, now U.S. Pat. No. 4,307,265). In this known circuit arrangement, a number of converters is provided, which converters are connected to connecting circuits of the exchange system which belong to two different groups of connecting circuits. In the course of a connection between a transmitter operating in accordance with the first data transmission procedure and the first data format and a receiver operating in accordance with the second data transmission procedure and the second data format, a converter of this kind is employed to execute the requisite conversion procedures. For this purpose, the converter in question is seized by the exchange system in response to a corresponding request. In order to be able to seize one of the plurality of converters, items of information concerning the availability of the relevant converters must be available to the exchange system.

SUMMARY OF THE INVENTION

The object of the present invention is to provide a manner in which, on the basis of a method of the type generally referred to above, items of information concerning the free status or the busy status of the individual signal converters can be made available in a relatively simple manner to the data exchange system.

The above object is achieved, according to the present invention and in a method of the type generally set forth above, in that following the forwarding of the signals which have previously been supplied to the relevant signal converter for the purpose of signal conversion, the signal converter emits a special free signal which may differ from an accompanying signal which indicates the end of the signal transmission, and which directly changes the busy status signal which indicates the busy status of this signal converter into a free status signal.

The invention involves the advantage that items of information concerning the busy states of the signal converters involved in a signal conversion can be made available in the data exchange system in a relatively simple manner.

Advantageously, the free signal consists of a control signal which is separately stored in the signal converter in question and which is emitted from the relevant signal converter following the emission of information signals which have been previously supplied to the signal converter. This results in the advantage of a particularly low control expense for the production of the free signal.

The signal converter in question can supply the data exchange system with a control signal which indicates its busy status in the event that the signal converter in question is disturbed. This results in the advantage that it can be ensured that signal converters which are inserviceable for signal conversion are not seized by the data exchange system.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
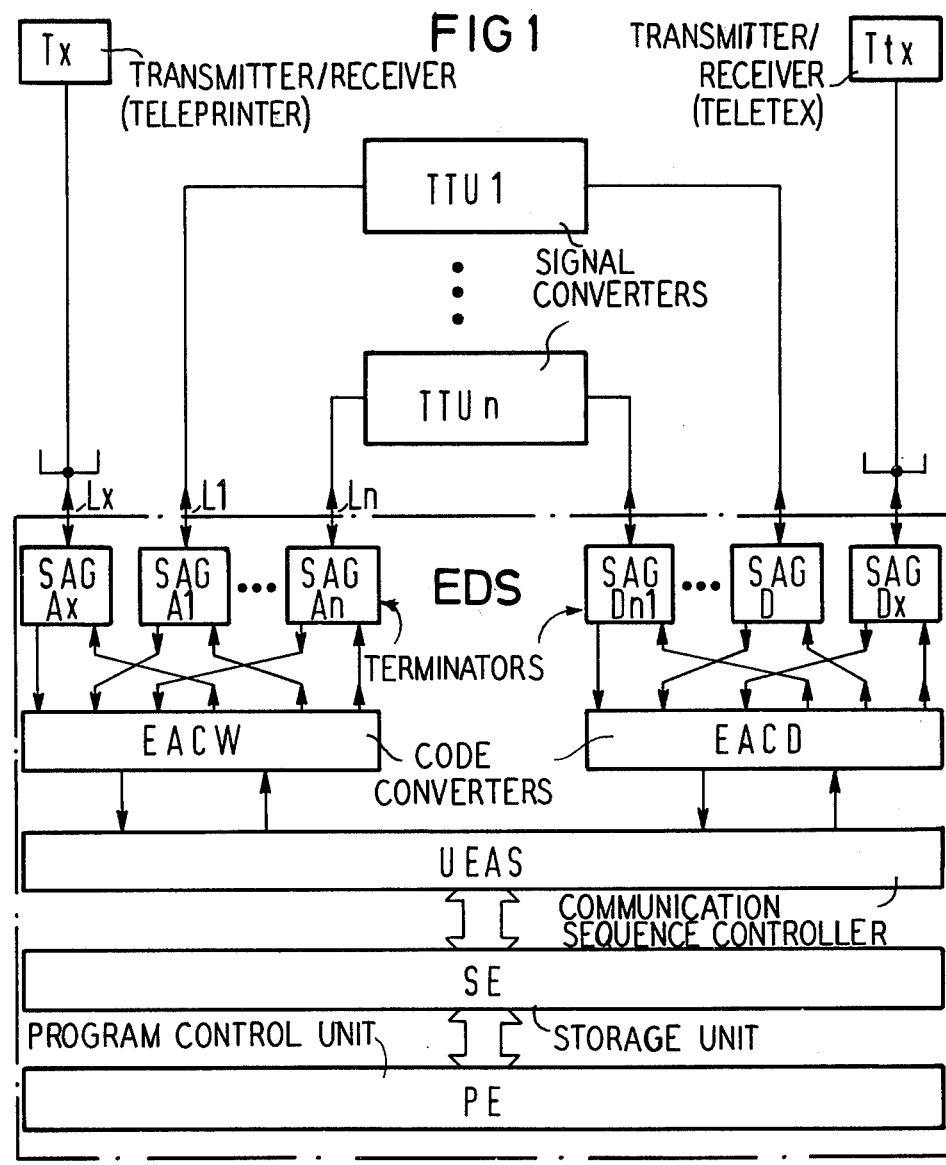
FIG. 1 is a block circuit diagram of a data exchange system to which transmitters/receivers and signal converters are connected.

FIG. 1 illustrates a section of a known electronic data exchange system EDS corresponding to the aforementioned German patent application P 29 38 750. Of this data exchange system EDS, there has been shown only terminator circuits SAGAx, SAGA1—SAGAn which belong to a first group of terminator circuits, terminator circuits SAGDx, SAGD1—SAGDn which belong to a second group of terminator circuits, input/output code converters EACW and EACD which are assigned to the individual groups of terminator circuits, a communication sequence controller UEAS, a storage unit SE and a program control unit TE. The terminator circuits, hereinafter simply referred to as "terminators", are each connected to the input/output code converter EACW and serve to process digital signals in respect of polarity changes. The terminators which are connected to the other input/output code coverter EACD serve to process so-called bit groups, i.e. digital signals which each comprise a plurality of bits—for example eight bits—and which are also referred to as envelopes.

Of the terminators indicated in FIG. 1, certain of the terminators which process polarity changes are connected to transmitting/receiving devices which emit and receive digital signals in accordance with a first data transmission rate and in a first data format. These transmitters/receivers will be assumed to represent conventional teleprinter or telex stations of which one reference Tx is indicated in FIG. 1. These stations will be assumed to operate at a data transmission rate of 50 Bd and employing international telegraph alphabet No. 2, thus in accordance with a start-stop data format. Here, the telex station Tx is connected to the terminator SAGAx via a line Lx which, for example, is operated in semi-duplex. A multiple connection mark occurring on the line Lx is to indicate that a plurality of such stations can be connected to the terminator SAGAx.

In accordance with FIG. 1, certain of the terminators which process digital signals in the form of bit groups and envelopes are connected to transmitters/receivers which can emit and receive digital signals in serial fashion in the form of bit groups and envelopes. These transmitter/receivers will be assumed to represent so-called office teleprinter stations which are also referred to as teletex stations. One such teletex station is referenced Ttx in FIG. 1. The teletex station Ttx is connected to the terminator SAGDx. A multiple connection mark occurring on the connection line in question is to indicate that a plurality of such stations can also be connected to the relevant terminator SAGDx. With regard to the teletex stations, it should be noted that these can emit and receive digital signals which occur, for example, in serial fashion and at a data transmission rate of 2400 bit/sec and, in fact, as synchronous data signals. Therefore, data signals of this kind are not determined by start and stop elements.

The data exchange system EDS illustrated in FIG. 1 is connected to a number of signal converters TTU-1—TTUn. The construction of these signal converters has already been described in the aforementioned German patent application P 29 38 750; therefore, it will be assumed to be known.

With regard to the following description, it should be noted that the signal converter TTU1 is connected to the terminator SAGA1 via a L1 both at the transmitting end and at the receiving end, and that the signal converter TTUn is connected to the terminator SAGAn via a line Ln both at the transmitting end and at their receiving end. The signal converters in question are connected by further signal inputs/outputs to the terminator circuits SAGD1—SAGDn. By way of the aforementioned connection lines, the signal converters receive the digital signals which are to be converted in respect of the data transmission procedure and in the data format, and emit the converted digital signals. This means that the signal converters convert the telex signals with which they are supplied into digital signals which can be forwarded to the teletex stations and convert digital signals emitted from the teletex stations into telex signals. This conversion can also include the fact that special symbols (e.g. dollar symbols) emitted from a teletex station can be transmitted in written form to the telex station in question.

Figure 2:
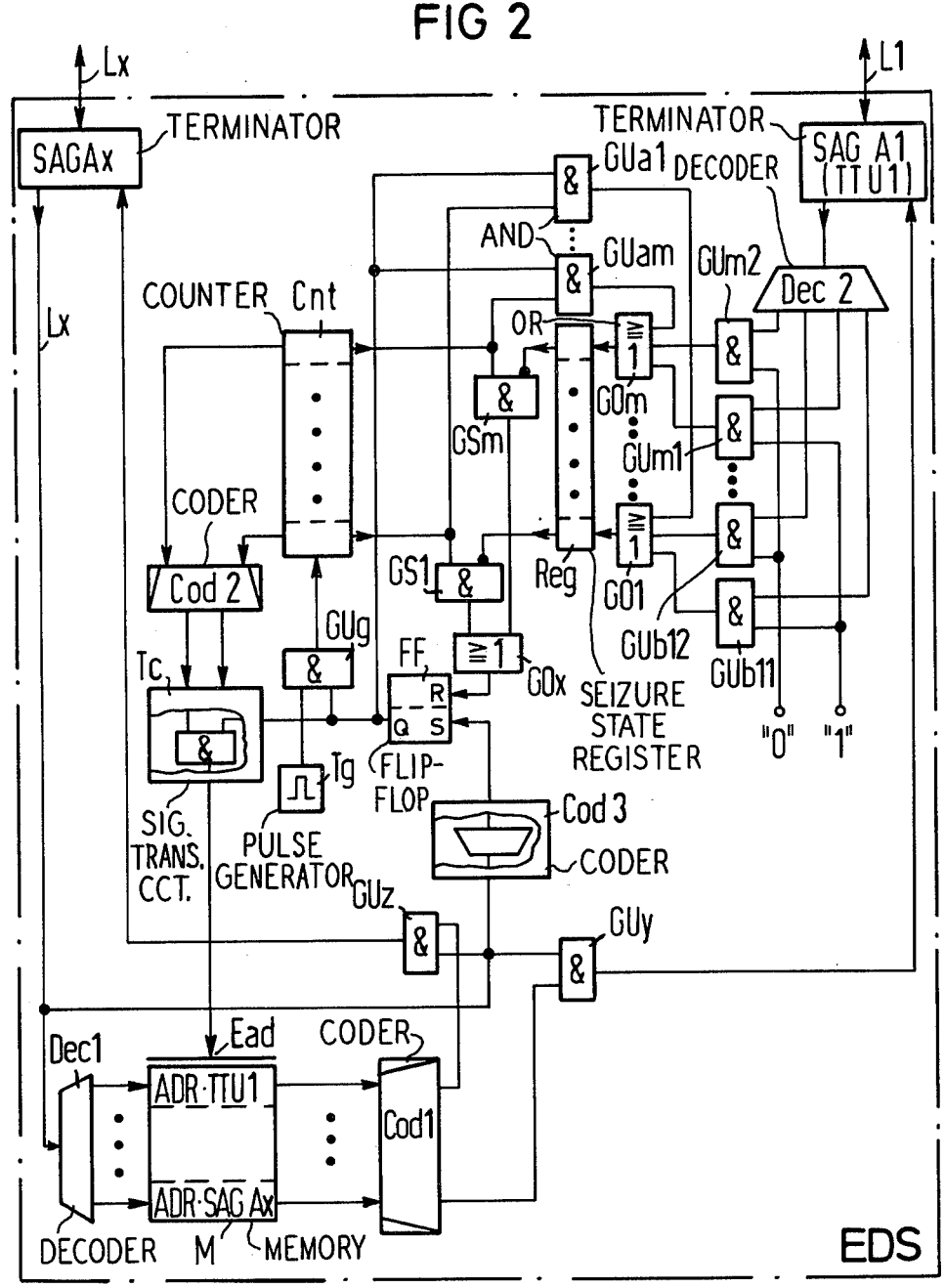
FIG. 2 is a block circuit diagram illustrating the structure of a portion of the data exchange system of FIG. 1 as an aid in explaining the invention.

FIG. 2 shows a portion of the data exchange system EDS of FIG. 1 in illustrating the method of the present invention. The terminators SAGAx and SAGA1 of FIG. 1 are also illustrated in FIG. 2. The line Lx likewise indicated in FIG. 1 is connected to the terminator 1 circuit SAGAx, and the line L1 of FIG. 1 is connected to the terminator SAGA1. AS indicated in FIG. 2, the terminator SAGA1 is connected to the signal converter TTU1.

The circuit arrangement of FIG. 2 contains a seizure status memory, indicated by a register Reg, and which contains items of information concerning the free/busy status of the individual signal converters. The outputs of the individual register stages (1-bit register stages) of the register Reg are connected to the blocking inputs of inhibiting elements GS1—GSm formed by AND gates having inhibit inputs, which are connected by signal inputs to the outputs of the counter stages of the counter Cnt. The counter Cnt will be assumed to be designed in such a manner that it emits an output signal "1" only from one of its counter outputs.

The inhibiting elements GS1—GSm are connected by their outputs via an OR gate GOx to a reset input of a flip-flop FF. The flip-flop FF is connected by its setting input S to the output of a coder Cod3 which, in response to a control signal supplied at its input, is operable to emit a "1" signal from its output. In FIG. 2, the coder has been represented as an arrangement which contains a decoder circuit. The coder Cod3 in question is connected at its input by way of a signal output line Lx to the terminator SAGAx.

The flip-flop FF is connected by its output O—which in the set state carries a "1" signal—to an input of an AND gate GUg. The AND gate GUg is connected by a further input to the output of a pulse generator Tg. The AND gate GUg is connected by its output to a counting input of the counter Cnt. The output Q of the flip-flop FF is also connected to the control input of a signal transmission circuit Tc in which only one inhibiting element is indicated and which becomes transmissive in response to the supply of a "0" control signal from the output Q of the flip-flop FF. The signal transmission circuit Tc may contain a plurality of logic elements in order to be able to emit from its output signals which have been supplied to the input side thereof; these are addresses.

Finally, the output Q of the flip-flop FF is connected to first inputs of the further AND gates GUa1—GUam. The other inputs of these AND gates are connected to the counter outputs of the counter Cnt. The outputs of the AND gates are each connected, via an OR gate GO1—GOm, to the write-in inputs of the register stages of the register Reg. Further inputs of the last-mentioned OR gates GO1—GOm are connected to the outputs of a plurality of AND gates GUb11, GUb12—GUm1, GUm2. Of these AND gates, the AND gates GUb1-1—GUm1 are commonly connected by a first of their inputs to a circuit point which is continuously supplied with a "1" signal. The other AND gates GUb1-2—GUm2 are commonly connected by first inputs thereof to a circuit point which is continuously supplied with a "0" signal. At their other inputs, the AND gates GUb11, GUb12—GUm1, GUm2 are connected to the outputs of a decoder Dec2 which is connected at its input to the output of the terminator SAGA1.

The aforementioned counter Cnt is also connected by its counter outputs to the inputs of a coder Cod2. This coder recodes the counter signals with which it has been supplied from the counter Cnt; the recoded counter signals serve as addresses for the operation of a memory M shown in the lower portion of FIG. 2. As already mentioned, the signal transmission circuit Tc serves to transmit the addresses in question. This circuit is connected at its input to the outputs of the coder Cod2 and at its output is connected to a write-in input Ead of the memory M. The memory M serves as a connection memory which—as already known in the case of the data exchange system EDS—contains, for each line (e.g. Lx) which represents a feeder line and supplies digital signals, a storage cell in which the address of the transmission line (e.g. L1) in question which represents a trunk line and via which the digital signals in question will be output, is already recorded or will be recorded.

The memory M is connected by its addressing inputs to the outputs of a decoder Dec1 which is connected at its input via the line Lx to the terminator SAGAx. At its signal outputs—which in response to appropriate control each carry an output signal—the memory M is connected to the input side of a coder Cod1. In accordance with FIG. 2, the coder Cod1 is connected by its output to the first inputs of two AND gates GUy and GUz.

The two AND gates GUy and GUz are commonly connected by their first inputs to the aforementioned line Lx. At its output, the AND gate GUy is connected to a signal input of the terminator SAGA1. The AND gate GUz has its output connected to a signal input of the terminator SAGAx.

As already mentioned, in its storage cells assigned to the individual feeder lines, the memory M contains addresses for the trunk lines which are to be used. In this context, in FIG. 2 ADR.TTU1 indicates that digital signals from the feeder line which is assigned to the uppermost cell in the memory M are to be forwarded via a trunk line which leads to the first signal converter TTU1. Similarly, the address ADR.SAGAx given in the memory M indicates that digital signals from the feeder line which is assigned to the last storage cell in the memory M are forwarded via a trunk line which is connected to the terminator SAGAx.

With the above in mind, the method of the present invention will be explained in detail making reference to the circuit arrangement illustrated in FIG. 2. Here, it will firstly be assumed that the circuit arrangement in question is in the starting state in which initially no connection will be assumed to exist. On the basis of this state, it is now assumed that the telex station connected to the line Lx has a connection request that a signal converter be included in this connection. With regard to FIG. 1, this means that the telex station in question wishes to transmit digital signals to a teletex station. For this purpose, the telex station emits a message signal which characterizes the desired connection and is recognized as such by the coder Cod3. The coder Cod3 subsequently emits from its output a "1" signal which results in the setting of the flip-flop FF which previously occupied the reset state. The "1" signal subsequently emitted from the output Q of the flip-flop FF, on the one hand, causes the signal transmission circuit Tc to block so that signals fed to the input of this circuit are not emitted from the output. On the other hand, the "1" signal emitted from the output Q of the flip-flop FF causes the AND gate GUg to transmit the clock pulses from the clock pulse generator Tg. These clock pulses reach the counting input of the counter Cnt which subsequently executes its counting operation, for example in the period of the occurring clock pulses. Furthermore, the "1" signal emitted from the output Q of the flip-flop FF causes the AND gates GUa1—GUam to be brought into the transmitting state.

As already mentioned, in its counter positions, the counter Cnt emits a "1" signal only from one of its counter outputs. As a result, the inhibiting elements GS1—GSm are consecutively brought into the transmitting state. That inhibiting element which at its blocking input receives a "0" signal from the associated register cell of the register Reg then emits a "1" signal from its output. It should be noted that the presence of a "0" state in the particular cell of the register Reg is indicative of the fact that the associated signal converter (TTU) still occupies the free state. On the other hand, a "1" state in the particular register cell of the register Reg is indicative of the fact that the associated signal converter (TTU) is busy. The assignment between the individual register cells of the register Reg and the signal converter (TTU) takes into account the various counter positions of the counter Cnt which emits the addresses of all the signal converters (TTU) in its different counter positions.

If it is assumed, for example, that the blocking input of the inhibiting element GSm of FIG. 2 is supplied with a "0" signal, the "1" signal which is emitted from this inhibiting element in response to appropriate control by the counter Cnt causes a "1" signal to be fed via the OR gate GOx to the reset input R of the flip-flop FF. As a result, the flip-flop FF reassumes its reset state into which a "0" signal occurs at the output Q. However, prior to the arrangement of the "0" signal, with the emission of a "1" signal via the OR gate GOm, the AND gate GUam—which has been previously brought into the transmitting state—causes a "1" to be written into the register cell in question of the register Reg. At this point, it should be pointed out that the procedures are timed to one another in such a manner that this writing-in procedure does not prevent the aforementioned resetting process of the flip-flop FF.

As a result of the "0" signal now emitted from the output Q of the flip-flop FF, the counter Cnt remains in the last counter position which it has assumed. However, the signal transmission circuit Tc is now able to transmit signals with which it has been supplied at its input by the coders Cod2 and which form the address of that signal converter to which the register cell in question in the register Reg is assigned. The address is now applied via the signal transmission circuit Tc to the write-in input Ead of the memory M. At this time, the memory M is operated from the output of the decoder Dec1 which is supplied via the terminator SAGAx with an operating signal from the telex station which wishes to establish a connection. As a result of the occurrence of this control signal, at its output which corresponds to the telex station in question and to the associated feeder line, the decoder Dec1 emits an address signal "1" which serves to operate a specific storage cell in the memory M. To return to the above-considered case, this means that the address of that signal converter which has been established at the first free signal converter is written into the storage cell in question.

As a result of the cyclic interrogation of the storage cells of a memory M, the AND gates GUy, GUz, which relate to the individual addresses, are then operated in accordance with FIG. 2 by a "1" signal via the coder Cod1. In the case of the address "ADR.TTU1" contained in the memory M, the AND gate GUy is operated which then emits the digital signals with which it has been supplied from the line Lx and thus from the telex station via the terminator circuit SAGA1 to the line L1 and thus to the signal converter TTU1 corresponding to FIG. 1. If, on the other hand, the AND gate GUz is operated by the coder Cod1, the digital signal supplied via the line Lx is returned to the terminator SAGAx in order, for example, to be transmitted to a telex station. In this case, the address "ADR·SAGAx" is read from the memory M in accordance with FIG. 2.

It will now be assumed that a signal converter, which was previously engaged in a connection, is released. In this case, the signal converter in question emits a special free signal to the data exchange system EDS. In the present example this free signal, which will be assumed to consist of a control signal separately stored in the particular signal converter, is emitted via the terminator by way of which the signal converter in question has previously been supplied with the digital signals which are to be converted. In the case of the signal converter TTU1 shown in FIG. 1, this is the terminator SAGA1. The terminator SAGA1 subsequently operates the decoder Dec2 illustrated in FIG. 2 and which, in response to this operation, emits a "1" signal from a specific output. The output in question is assigned to the particular signal converter which has emitted the operating signal to the particular decoder. In the case of the signal converter TTU1, the decoder Dec2 emits a "1" signal from its output which is connected to one input of the AND gate GUm2. As a result, the AND gate GUm2 emits from its output the "0" signal with which it has been supplied at an input and which is subsequently entered, via the OR gate GOm, into the register cell in question in the register Reg where the previously contained "1" is then replaced by the "0". As a result, the release as regards the signal converter TTU1 is completed in the register Reg. This means that in the course of a further allocation process, this signal converter can be re-seized.

From the above description it should be clear that the status signals indicating the free state or the busy state of the signal converters are stored in the register Reg of FIG. 2, thus in the data exchange system EDS. Therefore, on the occurrence of a connection request from a subscriber station, such as a telex station, for the establishment of a connection to a signal converter (TTU), the presence of free status signals in the data exchange system EDS is determined and, in fact, by the interrogation of the register Reg. At this point, it should be noted that connection requests can be taken into consideration even when they are supplied via a transmission line which is connected, for example, to a different exchange system. It should also be clear that a free status signal ("0") indicating the free state of a signal converter (TTU) becomes altered into a busy state signal ("1") in the register Reg on the seizure of the signal converter in question, and that this busy state signal ("1") is not reconverted into a free state signal ("0") until the signal converter (TTU) in question again becomes available. This change in the signal states in the register Reg, which concerns the fact that the signal converter in question has again become available, is now put into effect by the signal converter when the signals with which it has been previously supplied for signal conversion have been transmitted. For this purpose, as already mentioned, the signal converter emits a special free signal which in the present example differs from an accompanying signal which indicates the end of the signal transmission. The reason for this is that the aforementioned accompanying signal is a text signal which is fed to the desired signal receiver, together with the digital signals, and which need not offer any reference to the fact that the signal converter is again available. The aforementioned free signal can advantageously be formed by a control signal which is separately stored in the signal converter and which is emitted from the particular signal converter following the emission of the information signals with which it has previously been supplied. The occurrence of this control signal and of the free signal causes the engaged status signal ("1") which indicates the busy state of the particular signal converter to be directly changed into a free state signal ("0") in the data exchange system EDS.

In order to prevent a possibly-disturbed signal converter from being seized, it is provided that the signal converter itself supplies the data exchange system EDS with a control signal indicative of its busy state. With regard to the conditions indicated in FIG. 2, this means that the decoder Dec2 emits a "1" signal from its output which is connected to one input of the AND gate GUm1. This "1" signal is then entered into that cell of the register Reg which has been assigned to the signal converter in question.

In the foregoing, the principle of the invention has been explained with reference to signal transmission from a telex station to a teletex station including a signal converter (TTU) in the connection. However, it should be noted that the principle of the invention can also be used in the same manner in the event that signal transmission takes place from a teletex station to a telex station including a signal converter (TTU). Fundamentally, procedures corresponding to those set forth above in association with FIG. 2 then take place which, however, do not need to be explained in detail herein.

Finally, it should also be noted that although the circuit arrangement illustrated in FIG. 2 has been explained in terms of discrete logic elements—which will be assumed, in particular, to consist of so-called tristate logic linking elements—more complex forms of structure are also possible, including at least one microprocessor.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for establishing connections from subscriber stations and transmissions lines which are connected to a data exchange system and which process and transmit signals in accordance with different procedures to signal converters which are likewise connected to the data exchange system, and whose status signals, which indicate the free state or the engaged state, are stored in the data exchange system, wherein, on the occurrence of a connection request from a subscriber station or via a transmission line for the establishment of a connection to a signal converter, the presence of free status signals in the data exchange system is determined, and wherein, upon the seizure of the signal converter in question, a free status signal indicating the free state of a signal converter is charged into a busy state signal which is not reconverted into a free state signal until the signal converter in question again becomes available, comprising the steps of:

providing the free state signal as a control signal and separately storing the same in the signal converter;

transmitting the signal supplied for signal conversion and then emitting the free state signal from the signal converter, along with an accompanying signal indicating the end of signal transmission, to the data exchange system;

converting the busy state signal indicating the busy state of the signal converter to a free state signal and storing the same in the data exchange system; and supplying to the data exchange system from the signal converter a control signal indicative of the busy state in the event that the signal converter is not serviceable.

* * * * *